United States Patent [19]
Ikeda et al.

[11] 3,710,201
[45] Jan. 9, 1973

[54] COULOMETER WITH SOLID ELECTROLYTE

[75] Inventors: Hironosuke Ikeda; Tetsuya Kondo, both of Osaka, Japan

[73] Assignee: Sanyo Electric Co., Ltd., Osaka-fu, Japan

[22] Filed: Feb. 4, 1971

[21] Appl. No.: 112,757

[30] Foreign Application Priority Data

Feb. 4, 1970    Japan .................................. 45/10172

[52] U.S. Cl. ................................. 317/230, 317/231
[51] Int. Cl. ............................................... H01g 9/00
[58] Field of Search ............. 317/230, 231, 232, 233; 250/622

[56] References Cited

UNITED STATES PATENTS

| | | | |
|---|---|---|---|
| 3,288,641 | 11/1966 | Rightmire | 317/231 X |
| 3,423,648 | 1/1969 | Mintz | 317/231 |
| 3,443,997 | 5/1969 | Argue et al. | 317/231 X |
| 3,544,852 | 12/1970 | Giles | 317/230 |
| 3,652,902 | 3/1972 | Hart et al. | 317/230 |

Primary Examiner—James D. Kallam
Attorney—Brufsky, Staas, Breiner and Halsey

[57] ABSTRACT

In a solid coulometer comprising two opposite layers, of which one is made of active metal and the other is made of inactive metal, and a layer of solid electrolyte of high iron conductivity sandwiched between them wherein the active metal ion is migrated and deposited on the inactive metal layer on charging and then the deposited active metal ion is removed from the inactive metal layer and re-deposited on the active metal layer on discharging so that an over-voltage is produced at the completion of the re-deposition, an improvement where the opposite metal layers are buried in the solid electrolyte layer, the opposite surface area of each of the opposite metal layers being smaller than the surface area of the solid electrolyte layer contacting thereto.

4 Claims, 9 Drawing Figures

INVENTORS
HIRONOSUKE IKEDA
TETSUYA KONDO

COULOMETER WITH SOLID ELECTROLYTE

The present invention relates to a solid coulometer comprising two opposite layers of which one is made of active metal and the other is made of inactive metal and a layer of solid electrolyte of high ion conductivity sandwiched between them and to its production.

In general, there has been used such a device as comprising an active metalic electrode of silver (X) and an inactive one of gold (Y) having a solid electrolyte (Z) such as $Ag_3SI$ between them as shown in FIG. 1 (a), wherein, when an electric current ($I_B$) (called a charging current hereinafter) flows from the active electrode (X) to the inactive one (Y), the active metal, a silver, is deposited as an ion on the opposite electrode (Y) through the solid electrolyte, till the state of FIG. 1 (b) is presented after the appointed electric capacity is charged. For the next process, when an electric current ($I_F$) (called discharging current hereinafter) flows in the opposite direction, the active metal (X') which has been deposited on the inactive metal (Y) is redeposited on the active electrode (X) through the solid electrolyte (Z). After the deposition has done, the ion conduction becomes the electron one, whereby the terminal voltage between both electrodes increases radically and rises to the cut off voltage (Vc) as shown FIG. 2. Accordingly, the element may control the said charging and discharging currents ($I_B$), ($I_F$) and has the feature as the timing element which may be used by detecting the cut off voltage (Vc) in case of discharging current. In the said element, however, there have been found many problems awaiting solution as following:

1. It is necessary for stabilizing the characteristic of the element and improving the precision as the timing element to effect the solution of the active metal into the solid electrolyte and the deposition of the active metal ion from the solid electrolyte uniformly. This element, however, has a low degree of affinity on the boundary surfaces of the layers of the active metal and the inactive metal with the layer of the solid electrolyte and the intimacy on the boundary surfaces becomes worse because of the repetitions of the solution and deposition of the active metal, which results in raising the overvoltage in the solution and deposition of the active metal. This phenomenon is promoted at a low temperature, whereby the cycle characteristic of the charging and discharging current grows worse and the gap is produced in the building up time of cut off voltage, which results in the decline of the timing precision and the electric capacity.

2. As the process for producing the element, there has been suggested such a process as making the electrodes by evaporating the active and inactive metals onto both edge surfaces of the solid electrolyte which is molded under a pressure. In this process, however, the limit of the evaporating quantity of the active metal and the weak intimacy with the layer of the solid electrolyte have resulted in the decline of the precision and the electric capacity.

3. The short circuit which is caused of the deposited metal growing around the fringe of the opposite metalic layer, i.e. on the side of the solid electrolyte by the repetitions of the solution and deposition of the active metal results in shortening its life.

Accordingly, the basic object of the present invention is, for solving the said problems, to provide the coulometer of the improved precision as the timing element.

Another object of the present invention is to elevate the affinity on the contact surfaces of the solid element and to improve the voltage characteristic in case of charging and discharging current and the decline of the electric capacity.

Further, the additional object is to improve the precision of detecting cut off voltage and to delete the cause of miss action in the circuit.

Practical and presently preferred embodiments of the present invention are illustratively shown in the following Examples, reference being had to the accompanying drawings wherein.

EXAMPLE 1

Figure 1A:
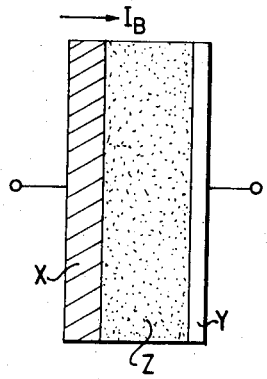
FIG. 1 is an illustrative representation of a preferred embodiment of a solid coulometer in accordance with this invention.
Figure 1B:
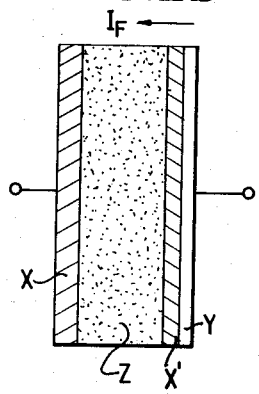
Figure 2:
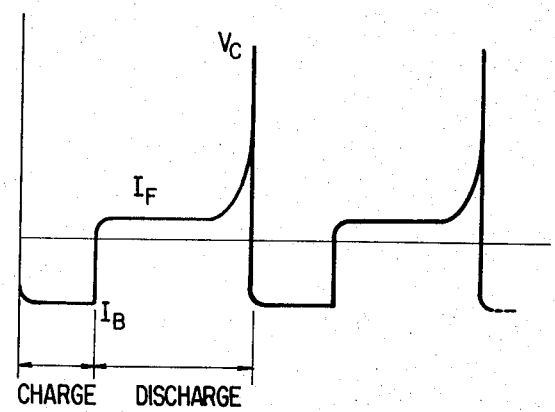
FIG. 2 is a graph showing the voltage characteristic in case of charging and discharging current of the solid coulometer in accordance with this invention.
Figure 3:
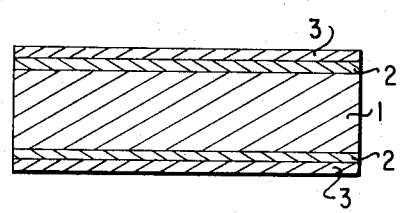
FIG. 3 is a cross sectional view of an embodiment of the solid coulometer in accordance with this invention.

In FIG. 3, the solid coulometer comprises the layer of the solid electrolyte 1 of $Ag_3SI$ molded under a pressure, a pair of the layer of the active metal 2, 2 of amalgamated silver and a pair of the layer of the inactive metal 3, 3 of powdered carbon molded under a pressure, each layer being provided on both sides of the said layer of the solid electrolyte. For preparing the layer of the amalgamated silver 2, 10 g of powdered silver and 1 g of the refined mercury are mixed in the morter and are left still for 2 hours. 100 mg of the mixture per unit surface of the element is preliminarily molded under a pressure of about 2 ton/cm². The pellet thus formed being disposed between the layer of the solid electrolyte 1 and the layer of the inactive metal 3, this compound the resultant multi layer material is molded under the final pressure. Further, a method of amalgamation may be such one as steeping the active metal in a solution of mercury salt. Thus, there can be obtained the element which has the symmetrical repetition characteristic wherein there is effected the reciprocal migration of silver, being ionized, between the layer of the amalgamated silver 2 and the other layer of silver 2 with the reverse of the conductive direction. The effect of the amalgamated silver may be guessed that it can prove the affinity of the layer of the active metal 2 with the layer of the solid electrolyte 1 and elevate the electricity characteristic of the element by lowering the overvoltage in the solution and deposition of the silver.

Figure 5:
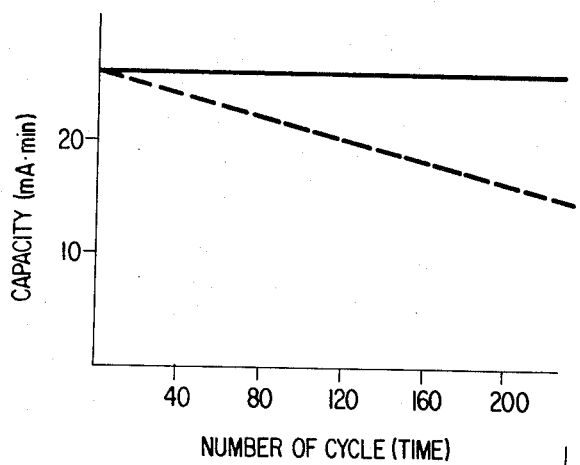
FIG. 5 is a graph showing the comparison of the degree of the capacity decline of the solid coulometer as shown in FIG. 1 with of the conventional one.
Figure 6:
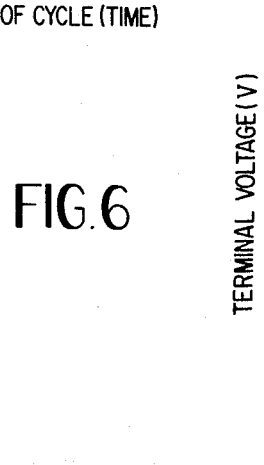
FIG. 6 is a graph showing the comparison of the voltage characteristic in case of charging and discharging current of the solid coulometer as shown in FIG. 1 with of the conventional one.

In FIG. 5, a graph shows the relationship between the repetition times of the current direction and the electric capacity, and in FIG. 6, it shows the voltage characteristic in case of charging and discharging current (wherein a line is in accordance with this invention and a dotted line is in accordance with the conventional one). From both FIGURES, it is seen that the electricity characteristic of the element can be remarkably elevated by the amalgamation of silver.

Further, there may be obtained the improved adhesion of the layer of the active metal with the layer of the solid electrolyte by making the former in such a way as molding after the amalgamated silver is mixed with the material of the layer of the solid electrolyte at the rate of 2 : 1 by weight.

EXAMPLE 2

Figure 4:
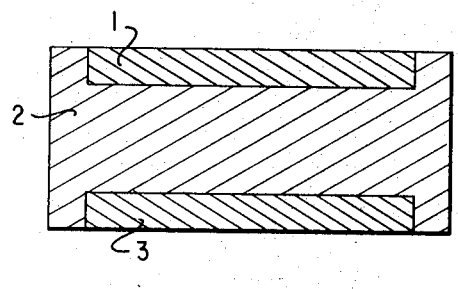
FIG. 4 is a cross sectional view of another embodiment of the solid coulometer in accordance with this invention.
Figure 7:
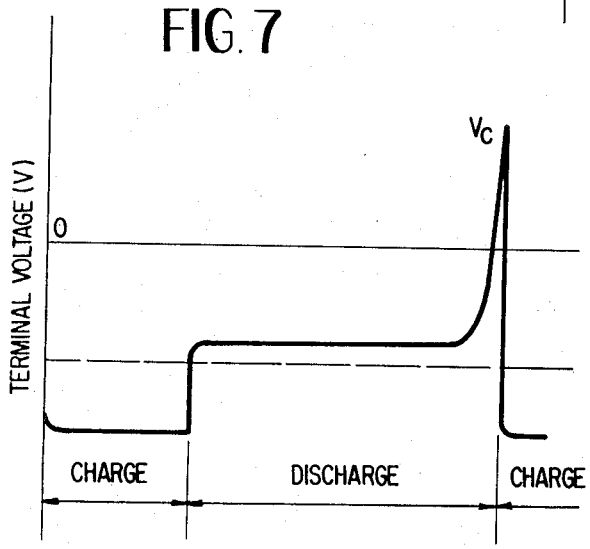
FIG. 7 is a graph showing the voltage characteristic in case of charging and discharging current of the modified coulometer in accordance with this invention.

For preparing the coulometer in FIG. 4, at first, the layer of the active metal 1 is made of 3 parts of silver or amalgamated silver, 6 parts of the solid electrolyte ($Ag_3SI \cdot HgI_2$) and 1 part of Te as an added metal. 100 mg of the mixed powders is molded under a pressure of 2 ton/cm$^2$ in the molding device of 8 mm in diameter, while the layer of the inactive metal 3 is molded as in the same manner as the above but utilizing 20 mg of powdered gold. Finally, 50 mg of the solid electrolyte corresponding to the layer 2 is laid on the said pellet of gold in the molding device of 10 mm in diameter and even, on which the pellet of active metal is laid. The compound resultant multi layer material is pressed under a pressure of 2 ton/cm$^2$. As shown in FIG. 4, the layers of the active metal 1 and the inactive metal 3 have both small diameters as compared with that of the layer of the solid electrolyte 2, of which the said layers 1 and 3 are buried in both edge sides. As described above, to the layer of the active metal 1, there is added the metal such as Te or Se which is electrochemically more unnoble than silver, which forms a sort of battery of which electric power is about $-0.2$ V. Thus the solid coulometer in accordance with this invention has the function as the battery and also as the conventional solid element. Accordingly the terminal voltage of the element by the present invention indicates a negative, as shown in FIG. 7, not only in case of charging current but also in case of discharging current except the building up voltage. In other words, the voltage characteristic of the element by the present invention is such one as shifting the point to the negative direction by 0.2 V as compared with the conventional one. Further, only the cut off voltage is in the range of positive when discharging current has done, whereby the sudden building up voltage can be obtained by 0 to 0.5 V.

Figure 8:
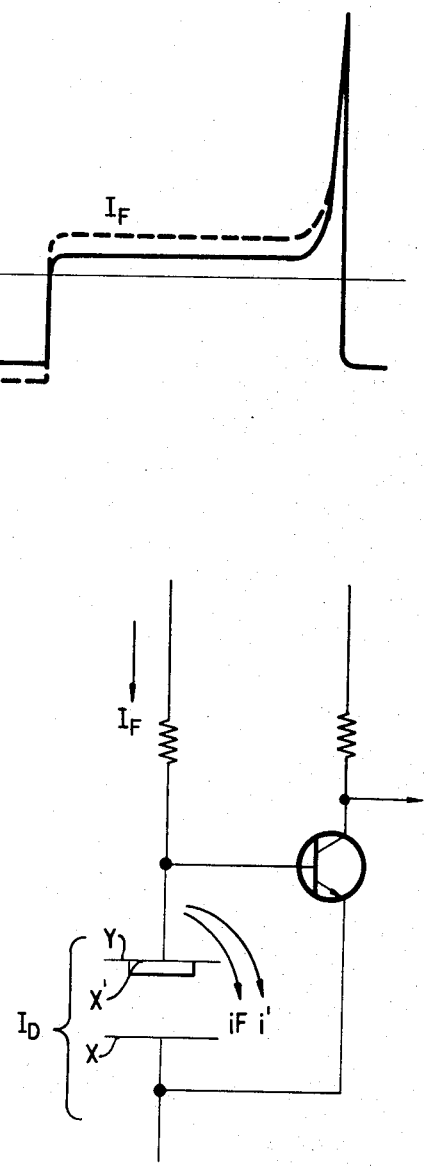
FIG. 8 is a diagrammatic representation of the circuit in case of using the solid coulometer in accordance with this invention as the bias control of the transistor.

In FIG. 8, wherein there is shown the circuit which represents the action of such an element as having the said voltage characteristic, the solid element (ID) is used as the bias control of a transistor (Tr), which can be controlled by detecting the building up voltage when the discharging current has done. In case of using the conventional element of which the voltage characteristic is shown in FIG. 6, supposing the said element (ID) is preliminarily charged with the appointed electric capacity and then discharged, the terminal voltage of the element is positive in the process of discharging current, whereby a small amount of electric current ($i'$), which is not desired, flows between a base and an emitter of the transistor in the regular direction. Accordingly, the substantial quantity of discharging current ($iF$) decreases since the appointed quantity of discharging current ($iF$) into the element (ID) flows divided into the transistor (Tr), therefore it takes a long time to discharge the appointed charging capacity and the precision of the timing element is quite lost. Further, since the low range of the voltage, 0.1 to 0.3 V, is detected in the transistor, in case of not obtaining the sudden building up voltage in the said range, the switching characteristic of the transistor becomes ineffective, which results in miss action in the circuit.

Those inclinations are removed by the solid coulometer of the present invention which has the voltage characteristic as shown in FIG. 7, wherein the said divided electric current is deleted, since the bias is reversely added to the transistor (Tr), to elevate the precision of the appointed time of the element, and since only the cut off voltage is positive, the precision of the detection may be improved more than ever.

The features of the solid coulometer by the present invention, comprising two opposite layers of which one is made of active metal and the other is made of inactive metal and layer of solid electrolyte of high ion conductivity sandwiched between them, are as follows:

1. The opposite layers of the metals of which the action surface areas are smaller than that of the layer of the solid electrolyte are buried in the latter, whereby the short circuit between the opposite electrodes which is produced by the growth of the deposited silver in repetitive uses may be dissolved and especially the characteristic of the building up voltage may be improved.

2. The layer of the active metal is made of the powder of amalgamated silver or the mixed amalgamated silver with the material of the solid electrolyte.

3. For preparing the solid coulometer, there is used such a process as comprising; the pellets being made by molding the powdered material of the layers of the active and the inactive metals under a pressure, the powdered material of the solid electrolyte being disposed between the said pellets and the compound layer being molded under the final pressure of higher than the preliminary pressure. The features 2, 3 contribute to the elevation of the affinity on the contact surfaces of the layer of the solid electrolyte with the opposite layers of the metals, and the improvement of the decline of the electric capacity in repetitive uses and of the gap of the building up voltage characteristic in case of charging and discharging current to attain the improved precision of the timing element.

4. As the additional feature, the solid coulometer by the present invention may be such one as described in Example 2 by adding to the layer of the active metal the material which is electrochemically more unnoble than silver.

The solid coulometer which may be improved by the present invention is; (1) possible to select the desired time and of less error; (2) composed of the solid material, therefore durable and small-sized. It needs only a small amount of electricity. (3) It may be used in the wide range of the temperature and has less decline of the characteristic. It is possible to be used by repetition for a long time and is to to be reliable.

The solid coulometer by the present invention has various uses as following, and there will be found new uses in future.

1. It is generally applied to the timer such as the program timer of the auto-washing machine, timers of an electric fan, a mixer and an electric range.

2. It is applied to the circulated timer such as that of an adapter of a venitration fan, of a frost remover of a refrigerator, of an auto-transmitter of a bouy and of a fuel providing control of a fuel cell.

3. It is applied to the memory device such as battery charger, medical instruments, instruments for meteorological observation, an electro-dynamometer, an indicating device for certifying term, a memory device of auto-selling-machine.

What is claimed is:

1. In a solid coulometer comprising two opposite layers, of which one is made of active metal and the other is made of inactive metal, and a layer of solid electrolyte of high ion conductivity sandwiched between them wherein the active metal ion migrates and deposits on the inactive metal layer on charging and during discharging the deposited active metal ion migrates from the inactive metal layer and re-deposits on the active metal layer whereby an over-voltage is produced at the completion of the re-deposition, the improvement comprising the opposite metal layers buried in the solid electrolyte layer, the opposite surface area of each of the opposite metal layers being smaller than the surface area of the solid electrolyte layer contacting said opposite metal layers.

2. The solid coulometer according to claim 1, wherein the active metal layer consists essentially of amalgamated silver.

3. The solid coulometer according to claim 1, wherein the active metal layer consists essentially of a dispersion of the same material as constituting the solid electrolyte layer in amalgamated silver.

4. The solid coulometer according to claim 1, wherein the active metal layer contains a metal more unnoble than silver.

* * * * *